(12) United States Patent
Loy et al.

(10) Patent No.: US 10,942,346 B2
(45) Date of Patent: Mar. 9, 2021

(54) METHODS AND SYSTEMS FOR GENERATING NON-DIFFRACTING LIGHT SHEETS FOR MULTICOLOR FLUORESCENCE MICROSCOPY

(71) Applicant: The Hong Kong University of Science and Technology, Hong Kong (CN)

(72) Inventors: Ming Tak Michael Loy, Hong Kong (CN); Shengwang Du, Hong Kong (CN); Teng Zhao, Hong Kong (CN); Sze Cheung Lau, Hong Kong (CN); Ying Wang, Hong Kong (CN); Yumian Su, Hong Kong (CN)

(73) Assignee: The Hong Kong University of Science and Technology, Clear Water Bay (HK)

( * ) Notice: Subject to any disclaimer, the term of this patent is extended or adjusted under 35 U.S.C. 154(b) by 461 days.

(21) Appl. No.: 15/544,890

(22) PCT Filed: Feb. 2, 2016

(86) PCT No.: PCT/CN2016/073199
§ 371 (c)(1),
(2) Date: Jul. 20, 2017

(87) PCT Pub. No.: WO2016/188143
PCT Pub. Date: Dec. 1, 2016

(65) Prior Publication Data
US 2018/0011303 A1 Jan. 11, 2018

Related U.S. Application Data

(60) Provisional application No. 62/179,928, filed on May 22, 2015.

(51) Int. Cl.
*G02B 21/36* (2006.01)
*G02B 21/08* (2006.01)
(Continued)

(52) U.S. Cl.
CPC ......... *G02B 21/16* (2013.01); *G02B 21/0032* (2013.01); *G02B 21/0076* (2013.01);
(Continued)

(58) Field of Classification Search
None
See application file for complete search history.

(56) References Cited

U.S. PATENT DOCUMENTS

| 10,310,246 B2 * | 6/2019 | Itoh ..................... G02B 26/0808 |
| 2005/0046818 A1 * | 3/2005 | Neil ....................... G02B 5/001 |
| | | 355/55 |

(Continued)

FOREIGN PATENT DOCUMENTS

| CN | 104204898 A | 12/2014 |
| CN | 104458683 A | 3/2015 |
| CN | 104515760 A | 4/2015 |

OTHER PUBLICATIONS

International Patent Application No. PCT/CN2016/073199: International Search Report dated Apr. 28, 2016, 9 pages.

*Primary Examiner* — Derek S. Chapel
(74) *Attorney, Agent, or Firm* — BakerHostetler

(57) ABSTRACT

Methods and systems for generating non-diffracting light sheets for multicolor fluorescence microscopy are disclosed. A method for generating a non-diffracting light patterned Bessel sheet comprises transmitting an input light beam through a Fourier transform lens the input light beam has a spatial intensity pattern at a first plane, and a Fourier plane is formed after the Fourier transform lens to obtain a first light beam; transmitting the first light beam through an annulus mask to obtain a second light beam; and transmitting the second light beam through an excitation objective lens to form a non-diffracting patterned light sheet. A method for generating a non-diffracting light line Bessel sheet comprises transmitting an input light beam at a first (Continued)

lane through an annulus mask to obtain a first light beam; and transmitting the first light beam through an excitation objective lens to form a non-diffracting Bessel light sheet.

8 Claims, 13 Drawing Sheets

(51) Int. Cl.
*G02B 27/09* (2006.01)
*G02B 21/16* (2006.01)
*G02B 27/58* (2006.01)
*G02B 21/00* (2006.01)

(52) U.S. Cl.
CPC ......... *G02B 21/082* (2013.01); *G02B 21/367* (2013.01); *G02B 27/0927* (2013.01); *G02B 27/0955* (2013.01); *G02B 27/0988* (2013.01); *G02B 27/58* (2013.01)

(56) References Cited

U.S. PATENT DOCUMENTS

| | | | |
|---|---|---|---|
| 2009/0310206 A1 | 12/2009 | Gluckstad | |
| 2010/0103962 A1* | 4/2010 | Ando | B23K 26/03 372/20 |
| 2010/0265575 A1* | 10/2010 | Lippert | G02B 21/16 359/385 |
| 2011/0122488 A1* | 5/2011 | Truong | G01N 21/6408 359/385 |
| 2011/0174986 A1* | 7/2011 | Kempe | G01N 21/6428 250/458.1 |
| 2013/0286181 A1* | 10/2013 | Betzig | H04N 7/18 348/79 |
| 2014/0285653 A1 | 9/2014 | Betzig | |
| 2015/0029325 A1 | 1/2015 | Dholakia et al. | |

* cited by examiner

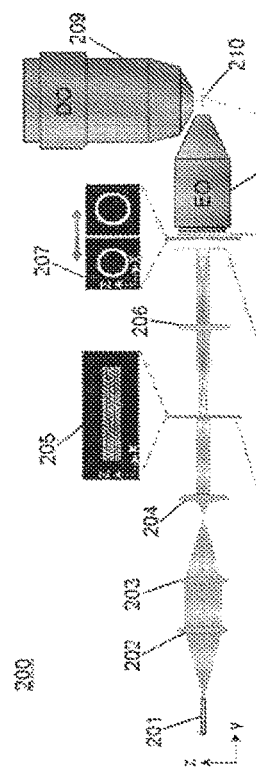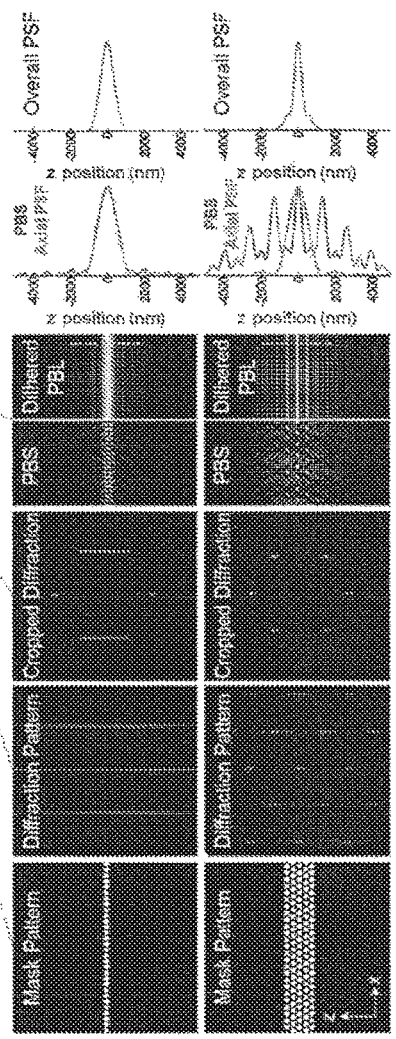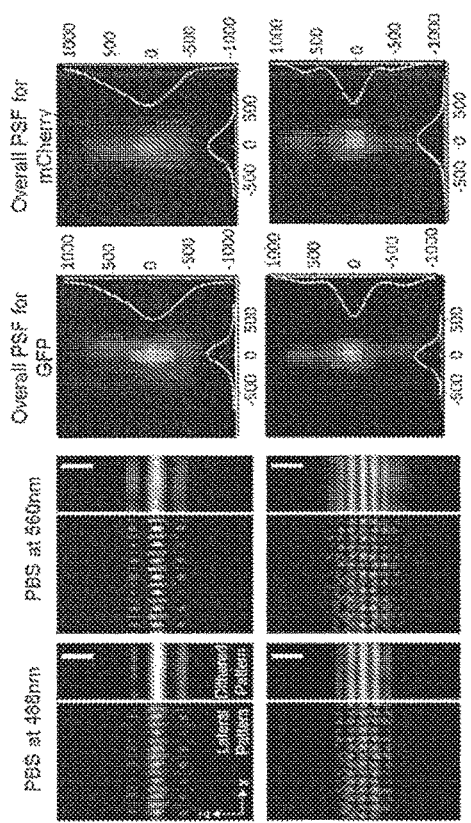
Figure 2a
Figure 2b
Figure 2c
Figure 2d
Figure 2e

METHODS AND SYSTEMS FOR GENERATING NON-DIFFRACTING LIGHT SHEETS FOR MULTICOLOR FLUORESCENCE MICROSCOPY

CROSS-REFERENCE TO RELATED APPLICATIONS

This application is the national phase of International Application No. PCT/CN2016/073199, titled "Methods and Systems for Generating Non-diffracting Light Sheets for Multicolor Fluorescence Microscopy", filed on Feb. 2, 2016, which claims priority and benefits of U.S. provisional application No. 62/179,928 filed on May 22, 2015, the entire disclosures of which are incorporated herein by reference.

FIELD

This application relates to methods and systems for generating non-diffracting light sheets for multicolor fluorescence microscopy.

BACKGROUND

In a light sheet (LS) microscopy, excitation and image acquisition are along optical paths at a right angle to each other. A light sheet can be generated using a cylindrical lens or by scanning a focused beam. A fluorescent image, through an objective lens focusing on the LS, is detected in a wide field by a fast and sensitive camera. Due to its fast wide field detection and reduced phototoxicity, the LS microscopy has received much attention recently.

For high axial resolution imaging, the LS must be as thin as possible while maintaining a uniform thickness over the field of view (FOV). This unfortunately cannot be optimized independently for a (Gaussian) laser beam due to diffraction, and requires a trade-off between the thickness and the length of the FOV. The Betzig group has introduced non-diffracting (ND) Bessel beam to address this tradeoff. Most recently, they introduced 'Lattice Light-Sheet Microscopy' (LLSM).

The key to the lattice light sheet is to create the desired lattice pattern in the front focal plane of the illumination objective. FIG. 1 illustrates a simplified schematics of a system 100 for generating lattice light sheet using a spatial light modulator (SLM) and a fixed annular ring mask. As shown in FIG. 1, a laser beam from a fiber exit 101 passes through a collimating lens 102 and a pair of cylindrical lenses 103 and 104. Then, the beam is reflected by a spatial light modulator 106 and split by a polarized beam splitter 105 before passing a Fourier transform lens 107. After passing a fixed annulus mark 108 arranged at a back pupil plane and an excitation objective 109, desired lattice light sheets 110 are generated. In their implementation, the spatial lattice pattern is produced by the SLM 106, and a fixed single-ring annular aperture 108 is placed in the Fourier plane of the lattice patterns to realize the ND Bessel characteristics. They were able to obtain excellent images with sheet thickness of ~300 nm and FOV 15 µm.

For multicolor imaging, as the wavelengths are changed, a different lattice pattern optimized for that wavelength must be loaded to the SLM.

This rapid changing of lattice patterns can only be done using a binary Ferroelectric SLM, which must serve as the master clock due to its operation requirements.

SUMMARY

The present application provides methods and systems for generating non-diffracting light sheets for multicolor fluorescence microscopy.

In a first aspect, the present application provides a method of generating non-diffracting light patterned Bessel sheets (PBS) and a system for generating non-diffracting light PBS for multicolor fluorescence microscopy. The method for generating a non-diffracting light PBS, comprising: transmitting an input light beam through a Fourier transform lens, wherein the input light beam has a spatial intensity pattern at a first plane, and a Fourier plane is formed after the Fourier transform lens to obtain a first light beam; transmitting the first light beam through an annulus mask arranged at the Fourier plane after the Fourier transform lens to obtain a second light beam; and then transmitting the second light beam through an excitation objective lens to form a non-diffracting patterned light sheet.

The system for generating multicolor non-diffracting light PBS for multicolor fluorescence microscopy, comprising: a first optical arrangement, configured to shape a light beam with more than one wavelengths by transmitting the light beam through a pattern mask at a first plane to obtain a patterned light beam; a Fourier transform lens arranged after the pattern mask though which the patterned light beam is transmitted, wherein the Fourier transform lens has a Fourier plane after the Fourier transform lens; an annulus mask arranged at the Fourier plane after the Fourier transform lens; an excitation objective lens arranged after the annulus mask and configured to form non-diffracting patterned light sheets for different wavelengths; and a detection objective lens arranged vertically to the non-diffracting light sheets configured to form the fluorescence images at an imaging device.

In a second aspect, the present application provides a method of generating non-diffracting light line Besseal sheets (LBS) and a system for generating non-diffracting light LBS for multicolor fluorescence microscopy. A method for generating a non-diffracting light LBS, comprising: transmitting an input light beam at a first plane that has a narrower intensity distribution along a first direction than that along a second direction vertical to the first direction through an annulus mask arranged at the first plane to obtain a first light beam; and then transmitting the first light beam through an excitation objective lens to form a non-diffracting Bessel light sheet.

A system for generating non-diffracting light LBS for multicolor fluorescence microscopy, comprising: a first optical arrangement, configured to shape a light beam with more than one wavelengths by transmitting the light beam through a single slit mask at a first plane to obtain a first light beam; a Fourier transform lens arranged after the single slit mask and configured to transmit the first light beam to obtain a second light beam, wherein the Fourier transform lens has a Fourier plane after the Fourier transform lens; an annulus mask arranged at the Fourier plane after the Fourier transform lens; an excitation objective lens arranged after the annulus mask and configured to form non-diffracting light sheets for different wavelengths; and a detection objective lens arranged vertically to the non-diffracting light sheets and configured to form the fluorescence images at an imaging device.

According to the present application, it is shown that the lattice periodical pattern is not necessary for producing ND light sheets. In this disclosure, new methods and systems for generating ND patterned light sheets that reduce cost and complexity for multicolor fluorescence microscopy systems are provided. Methods and systems for generating ND non-patterned light sheets are further provided.

BRIEF DESCRIPTION OF THE DRAWINGS

FIG. 2a illustrates an exemplary schematics of a system for generating light patterned Bessel sheets (PBS) according to an embodiment of the present application;

FIGS. 2b and 2c illustrate examples of two mask patterns and corresponding results applicable to the system of FIG. 2a;

FIGS. 2d and 2e illustrate the experimentally generated light PBSs at different wavelengths applicable to the system of FIG. 2a;

FIG. 4b illustrates the triggering sequence used in PBS imaging as shown in FIG. 4a;

FIG. 11a illustrates an exemplary schematics of a system for generating light line Bessel sheet (LBS) according to an embodiment of the present application;

FIGS. 11b and 11c illustrate examples of two mask patterns and corresponding results applicable to the system of FIG. 11a;

FIGS. 11d and 11e illustrate the experimentally generated LBSs at different wavelengths applicable to the system of FIG. 11a;

FIG. 11f illustrates the measured axial profile of Gaussian beam, LBS1 and LBS2 applicable to the system of FIG. 11a;

FIG. 13b illustrates the triggering sequence used in LBS imaging as shown in FIG. 13a;

DETAILED DESCRIPTION

Figure 1:
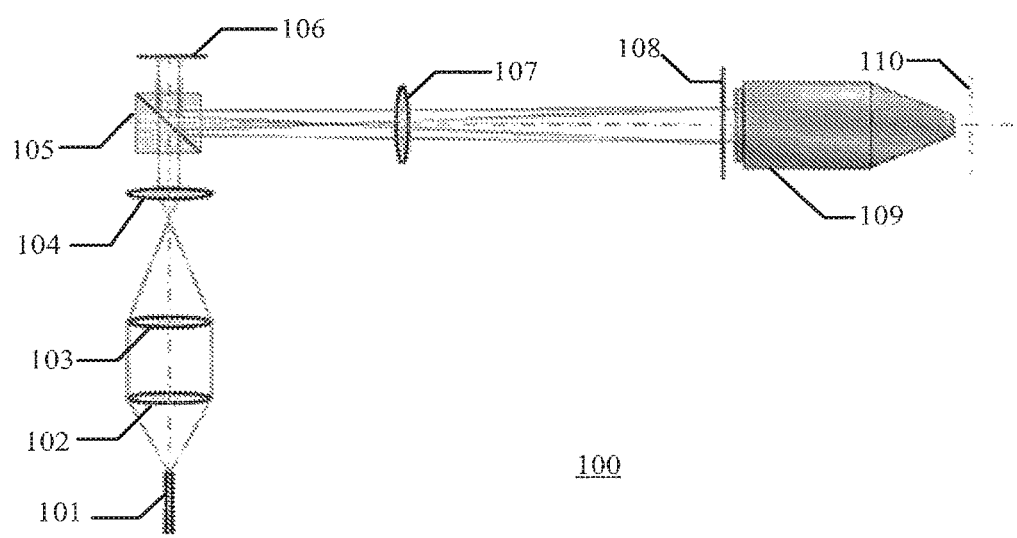
FIG. 1 illustrates an exemplary schematics of a system for generating lattice light sheet using SLM and a fixed annular ring mask in the prior art.

Hereinafter, the present application will be further explained in detail with reference to the accompanying drawings and embodiments. It should be understood that specific embodiments described herein intend to explain the relevant invention, rather than to limit the invention. In addition, it should be noted that only portions related to the present invention are shown in the accompanying drawings for the ease of description.

Firstly, the method and microscope system for generating ND light patterned Bessel sheets (PBS) according to an embodiment of the present application is described as below.

Referring to FIG. 2a, there is shown an exemplary schematics of a system 200 for generating non-diffracting light patterned Bessel sheets (PBS) for multicolor fluorescence microscopy according to an embodiment of the present application.

As shown, a laser beam from a fiber exit 201 passes through a collimating lens 202, a pair of cylindrical lenses 203 and 204, a fixed pattern mask 205, a Fourier transform lens 206, and an annulus mask 207. An excitation objective 208 and a detection objective 209 may be also provided to detect imaging at the sample plane 210. In the embodiment, the annulus mask 207 is arranged at the Flourier plane of the Fourier transform lens 206. The Fourier transform lens 206 transforms the pattern on the fixed pattern mask 205 to the Fourier plane. The annulus mask 207 placed at the Fourier plane further crops the diffraction pattern (i.e. the Fourier transform pattern). The Fourier plane (or the plane of annulus) is conjugated to the back focal plane of the excitation objective 208, which will reversely Fourier transform the cropped pattern and form the non-diffracting 2D pattern at the sample plane 210. This 2D pattern, namely PBL, will be dithered to form a light sheet for imaging.

Different from the SLM solution in which different patterns shall be loaded for different wavelengths, the fixed pattern mask 205 having a fixed 2D pattern according to the embodiment is applicable to different wavelengths. According to an embodiment, the annulus mask 207 may comprise a plurality of annulus with different sizes that are switchable for different wavelengths.

In particular, after passing the collimating lens 202 and the pair of cylindrical lenses 203 and 204, the laser beam from the fiber exit 201 is shaped into one or more light sheets so more energy can pass through the pattern mask, wherein different light sheets may have different wavelengths. As shown, the beam is defined as propagating along y axis.

The fixed pattern mask 205 may have a two dimensional pattern, possibly in the form of (but not limited to) 1D array of dots, or 2D arrays of dots. Other forms of pattern could also be used as the pattern mask to form the light sheet. With different mask patterns, one can craft patterned Bessel sheet (PBS) that is optimized for ultralow phototoxicity or high resolution. FIGS. 2b and 2c illustrate examples of mask patterns for ultralow phototoxicity (PBS1) or high resolution (PBS2) and corresponding results. From left to right, FIGS. 2b and 2c show the patterns on the mask; the diffraction pattern of the mask patterns; the diffraction pattern after cropped by the annulus with correct size; the cross-section of generated PBS at sample plane; the intensity plot along the dotted yellow line (blue) comparing to the axial point spread function of a NA=1.1 detection objective (red); and the axial plot of overall point spread function, which is compressed by the ultrathin PBS.

According to an embodiment, the mask pattern can be designed in a way so that the PBS has axial extent (the profile along z axial) only within the axial PSF of the detection objective, so that minimal amount of background and photo bleaching can be achieved. It is demonstrated that this can be done (but not limited to) by a single line of dots as shown in FIG. 2b.

According to an embodiment, the mask pattern can be designed in a way so that the PBS consists of multiple layers of tightly confined sheets, such that the overall PSF can be highly compressed by the middle layer to achieve a better axial resolution. It is demonstrated that this can be done (but not limited to) by a 2D array of dots as shown in FIG. 2c.

Contrary to the SLM solution shown in FIG. 1 in which the annulus has a fixed size, the size of the annulus to be used is switchable and, in particular, selected to fit the spatial distribution of the diffraction patterns, thus annulus switching is required when changing wavelengths. FIGS. 2d and 2e show the experimentally generated PBLs at different wavelengths (488 mn for GFP and 560 nm for mCherry), where ring-switching is applied so that the fit ring is separately applied to each wavelengths. The point spread functions for each PBS at both wavelengths are measured with 20 nm fluorescent beads (left two columns in FIGS. 2d and 2e), which are in good agreement with the theoretical plot in FIGS. 2b and 2c. Scale bar in FIGS. 2d and 2e is 5 µm.

Figure 3:
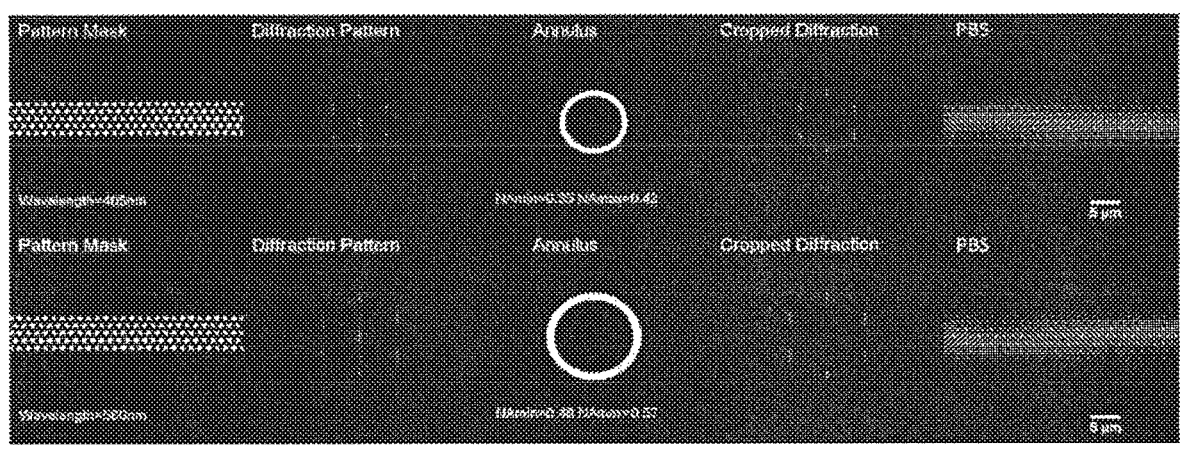
FIG. 3 illustrates a demonstration of generating light PBSs in different wavelengths with annuluses scaled to wavelengths according to an embodiment of the present application.

FIG. 3 illustrates a demonstration of generating PBS in different wavelengths with annuluses scaled to wavelengths. According to the present application, the annulus' size should be matched to the diffraction pattern. Due the wavelength dependency, the diffraction pattern will change size at different laser wavelengths. Therefore, the annulus should be able to change size when different color is used. This can be done by switching the annulus mechanically or use filter sets to allow only a certain wavelength to pass through a designated annulus as shown in FIG. 3. This has been demonstrated as shown in FIGS. 2d and 2e.

Hereinafter, examples of PBS microscopes, as well as control sequences, according to embodiments of the present application will be described with reference to FIGS. 4a, 4b.

Figure 4A:
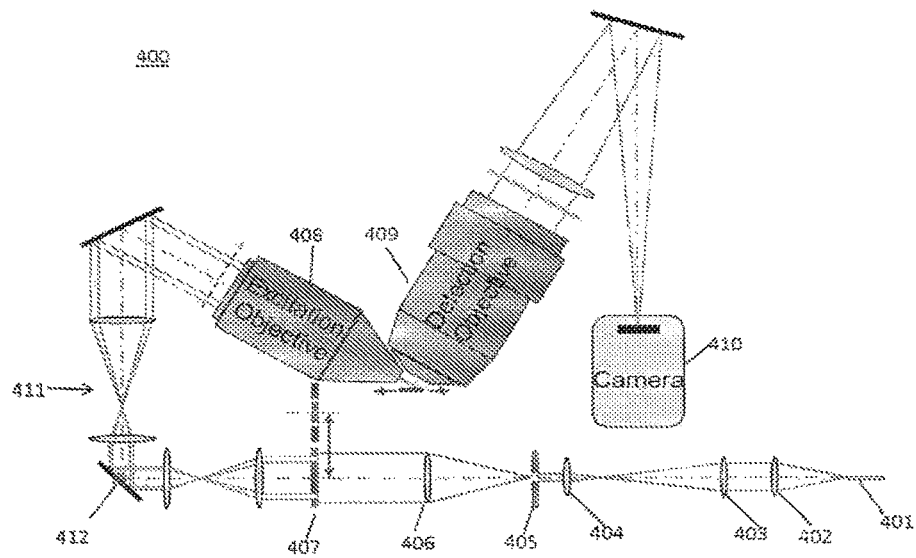
FIG. 4a illustrates the exemplary system schematics of a PBS microscope utilizing switchable annular rings according to an embodiment of the present application.
Figure 4B:
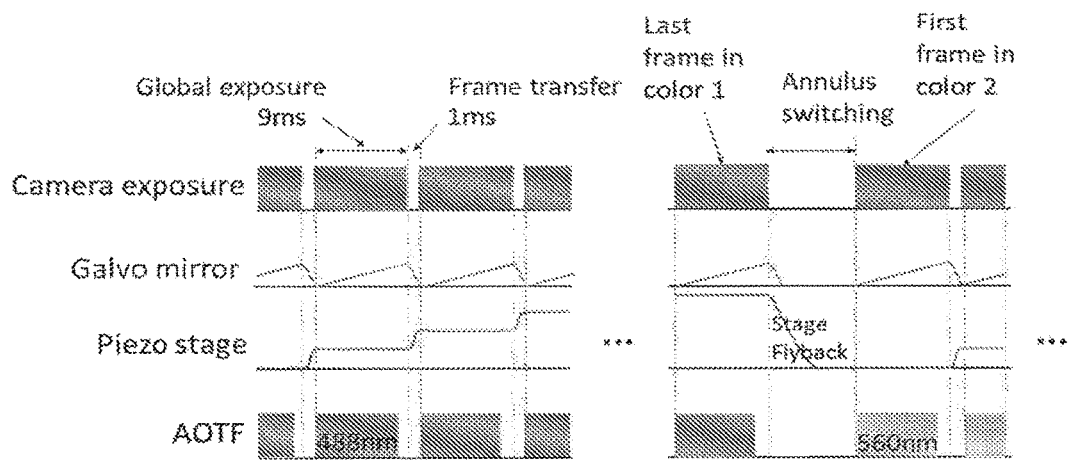

FIGS. 4a and 4b illustrates an exemplary system schematics of a PBS microscope and control sequence. FIG. 4a illustrates the exemplary system schematics of a PBS microscope. The fiber output 401 was collimated by a collimation lens 402 and shaped to a stripe by a pair of cylindrical lenses 403 and 404 before reaching the pattern mask 405. A lens 406 is used to perform Fourier transform after the pattern mask 405, and project the diffraction pattern onto a switchable annulus 407. The image of the annulus 407 is projected onto a galvo mirror 412 that dithers the beam during imaging, then zoomed by 3× via a telescope system 411 before projected onto the back focal plane of excitation objective 408 (Special optics, NA 0.7 WD 3.5 mm). The PBS is produced at sample plane 30° to the plane of coverslip. With the relative position between the emission and detection objectives fixed, the sample driven by a piezo stage is scanned horizontally. The fluorescent emission is collected by the detection objective 409 (Nikon, NA 1.1 WD 3 mm) and captured by a camera 410. FIG. 4b illustrates the triggering sequence used in PBS imaging as shown in FIG. 4a. Camera running in synchronized readout mode generates high output during the global exposure and low during data transfer. Laser controlled by an AOTF is turned on only during global exposure. For multicolor imaging, the annular ring has to be switched between colors. Therefore, the sample is scanned over volume by each wavelength separately. To dither the PBS, the galvo mirror is driven to scan for one period during each exposure.

Since the annular ring size is ~cm in size, the masks can be physically switched by a motorized filter wheel as the wavelength is changed, ensuring the center of the ring be placed at exactly the same place as it is changed. An example is shown in FIG. 2a, the two annular ring masks with different inner and outer NA sizes scaled by 488 nm and 561 nm ND illumination pattern can be aligned precisely into the optical path using this method.

Figure 5:
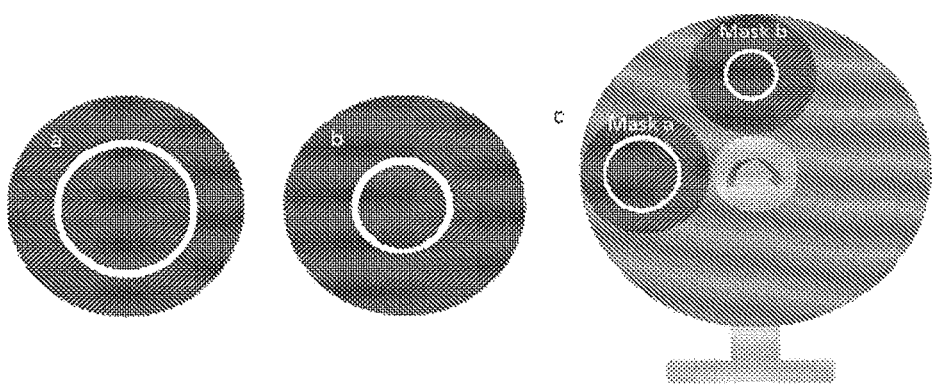
FIG. 5 illustrates an example for fast switching between two annular ring masks using a motorized filter wheel according to an embodiment of the present application.
Figure 6:
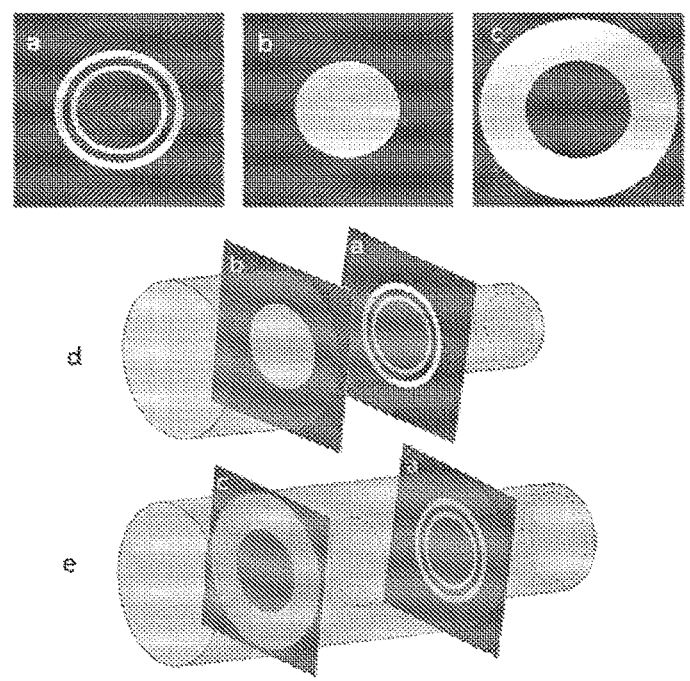
FIG. 6 illustrates an example of putting more than one rings on the same physical mask according to an embodiment of the present application.

Multi-color ND lightsheet illumination is also possible by adding more designed ring masks on the motorized filter wheel, as shown in FIG. 5. FIG. 5 illustrates an example for fast switching between two annular ring masks using a motorized filter wheel. In particular, annular ring mask "a" has inner and outer NA optimized for 561 nm illumination ND pattern in the Fourier domain; annular ring mask "b" has the size scaled for 488 nm illumination ND pattern in the Fourier domain; and a motorized filter wheel "c" can fast switch between mask "a" and mask "b".

According to an embodiment, for two (and possibly three) color imaging, a simpler method is to put 2 (or 3) rings on the same physical mask which remains fixed. Shutters of different sizes can be placed to block the unwanted ring (rings). FIG. 5 illustrates an example for fast switching between two annular ring masks using a double annular ring and a switcher, which includes the double ring mask "a"; the circular shutter "b" with diameter in between inner and outer rings of the mask "a"; and the ring shutter "c" with inner diameter in between inner and outer rings and outer diameter larger than outer ring in the mask "a"; The inner and outer ring masks can be alternated by combining "a" and "b" or "a" and "c", as shown in "d" and "e", respectively. That is, the mask "a" with two annular rings are combined with blocking masks "b" and "c", each of these blocking masks when used in combination with "a" will pass light through a single ring. The advantage of this method is that the two blocking masks that physically move need only to be placed to block a ring, and does not required the accuracy of the method as shown in FIG. 1, and will likely have cost advantages.

Figure 7:
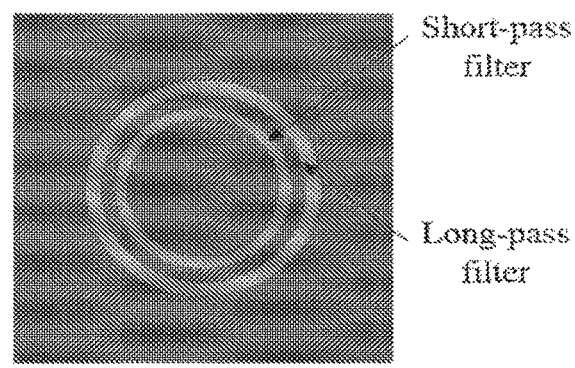
FIG. 7 illustrates a mask with two ring-shape bandpass filters according to an embodiment of the present application according to an embodiment of the present application.

According to an embodiment, the annular rings can be coated so that only the desired wavelength of light will pass, i.e. the ring appropriate for 488 nm light will be coated such that only 488 nm light will pass, blocking all others. FIG. 7 illustrates a mask with two ring-shape bandpass filters. In this case, no moving parts will be required. As illustrated in FIG. 7, a double annular ring is used, and filters are added in each slit of the double annular ring. The outer ring is covered by long pass filter, which will only allow 561 nm laser to pass, and the short pass filter in the inner ring will only allow 488 nm laser to pass. This configuration allows taking multicolor images simultaneously.

Figure 8:
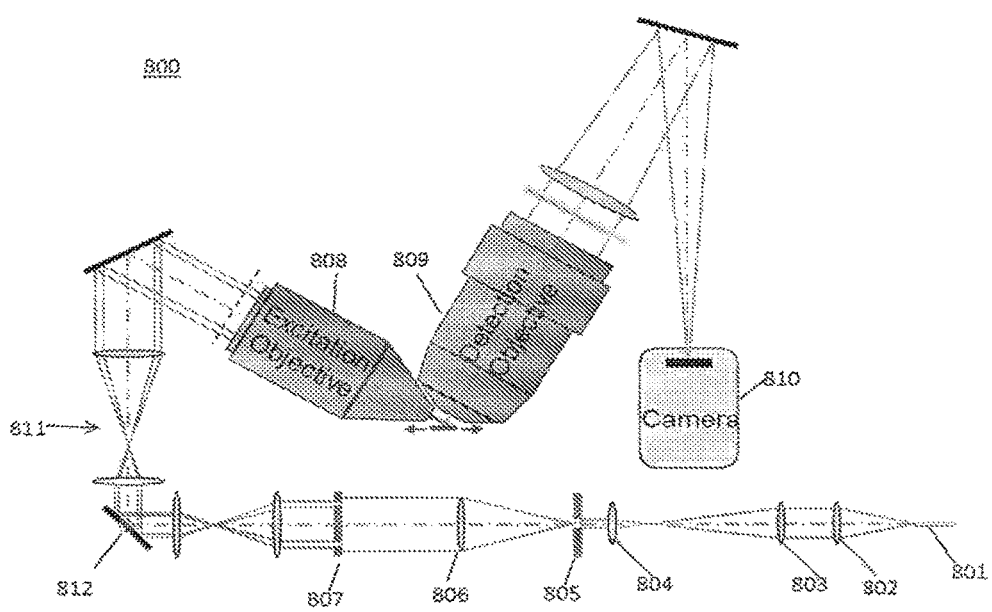
FIG. 8 illustrates the exemplary system schematics of a PBS microscope utilizing a LCD panel or a transmissive spatial light modulator as switchable annular rings according to an embodiment of the present application.

According to an embodiment, a SLM can also be used at the Fourier plane to generate rings of any size, as shown in FIG. 8. This can be a simple LCD panel or a spatial light modulator 807 since the feature sizes are large. It is also feasible to directly place the phase and intensity pattern in this Fourier plane through the LCD panel, to complement or even replace the function of the fixed spatial mask. For multicolor operation, the LCD panel will be programmed to display patterns of annulus with fitted size at different time. Components 801-806 and 808-812 are corresponding to 401-406 and 408-412 as shown in FIG. 4a, respectively.

Figure 9:
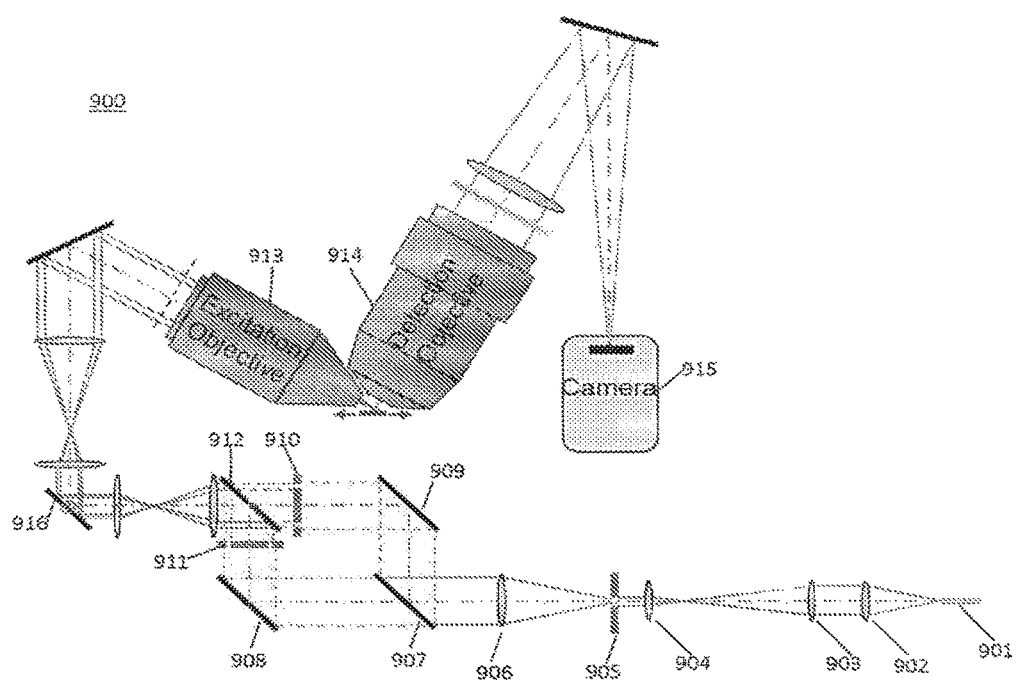
FIG. 9 illustrates the exemplary system schematics of a PBS microscope utilizing filter sets and fixed annuli for simultaneous multicolor imaging according to an embodiment of the present application.

According to an embodiment, for simultaneous multicolor imaging filter sets can be used to split different wavelength and combine after passing certain annuluses for each color, as shown in FIG. 9. In system 900, a dichroic mirror 907 is used to split beams in different wavelengths. The split beam in different wavelength, reflected by mirrors 908 and 909, respectively, passes through a fixed mask with optimized size 910 and 911 then combined by a dichroic mirror 912. Components 901-906 and 913-916 are corresponding to the components 401-406. 408-410 and 412 as shown in FIG. 4a, respectively.

Figure 10:
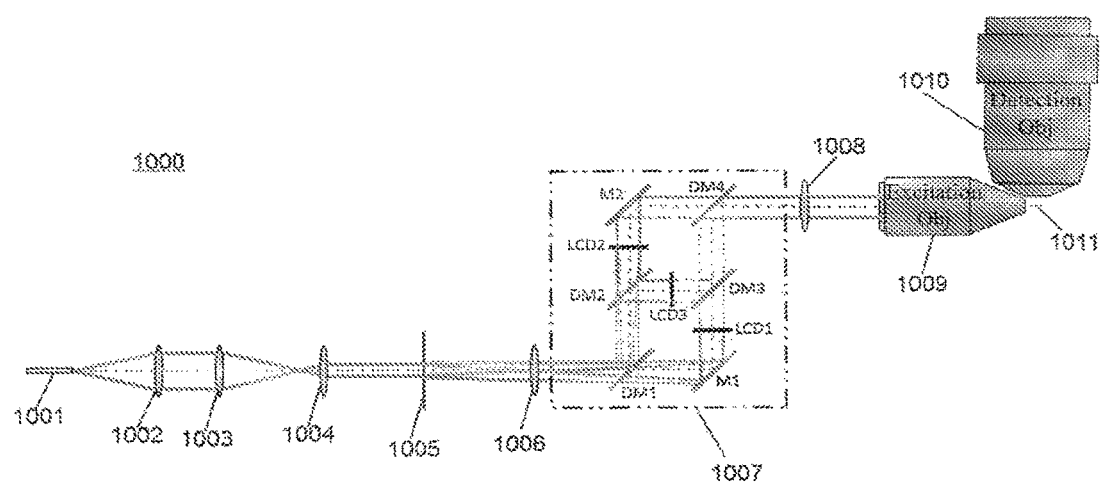
FIG. 10 illustrates an exemplary structure of a system using the 3LCD projector module according to an embodiment of the present application.

Alternatively, a 3LCD projector module can be used to produce multicolor PBS simultaneously. An exemplary structure of a system 1000 using the 3LCD projector module 1007 is shown in FIG. 10. In the system 1000, components 1001-1006 and 1009-1010 are corresponding to the components 401-406 and 408-409 as shown in FIG. 4a, respectively. It is noted that the 3LCD module can also be replaced by annulus with fitted size.

In a second aspect, methods and systems for generating smoothed ND light sheets without any structured pattern according to an embodiment of the present application are provided, in which the need of dithering is removed. This dramatically reduces the cost and complexity for a multicolor fluorescence microscopy system. Hereinafter, this type of ND light sheet in referred as line Bessel Sheet (LBS).

Figure 11:
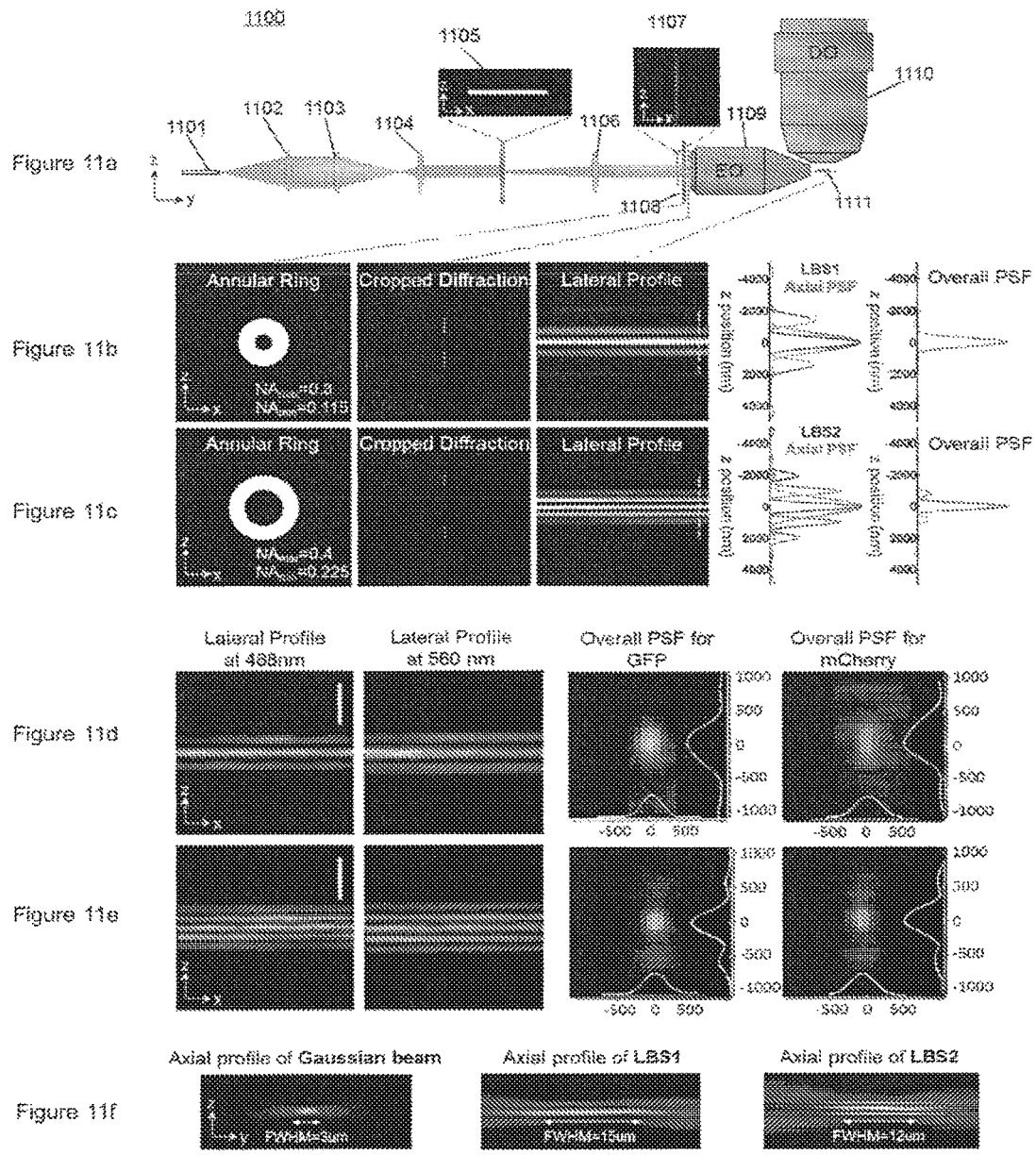

Referring to FIG. 11a, there is shown an exemplary schematics of a system 1100 for generating non-diffracting line Bessel sheets (LBS) sheets for multicolor fluorescence microscopy according to another embodiment of the present application.

As shown, a laser beam from a fiber exit 1101 passes through a collimating lens 1102, a pair of cylindrical lenses 1103 and 1104, a narrow slit 1105, a Fourier transform lens 1106, and an annulus mask 1107. An excitation objective 1109 and a detection objective 1110 may be also provided to detect imaging at the sample plane 1111. In the embodiment, the annulus mask 1107 is arranged at the Flourier plane of the Fourier transform lens 1106. The Fourier transform lens 1106 transforms the slit pattern on the fixed pattern mask 1105 to the Fourier plane. The annulus mask 1107 placed at the Fourier plane further crops the diffraction pattern 1108 (i.e. the Fourier transform pattern). The Fourier plane (or the plane of annulus) is conjugated to the back focal plane of the excitation objective 1109, which will reversely Fourier transform the cropped pattern and form the non-diffracting 2D pattern at the sample plane 1111. This 2D pattern, namely LBS, has no modulation along x-axis thus does not require dithering to produce a light sheet for imaging.

The system 1100 according to this embodiment differs from the system 200 of FIG. 2a in that the fixed pattern mask 405 has a pattern which is a single slit, instead of an array of dots, and the annulus mask 407 is a mask with a fixed annulus which does not require switching for multicolor imaging. The Fourier transform lens 1106 perform Fourier transform of the single slit, and obtain a simple line at the Fourier space. Similar to PBS, an annulus is placed at the Fourier plane and further crops the diffraction pattern. The Fourier plane (or the plane of annulus) is conjugated to the back focal plane of the excitation objective, which will reversely Fourier transform the cropped diffraction pattern (the line) and form the non-diffracting 2D light line Bessel sheet at the sample plane, namely LBS. LBS has no modulation along x axis thus no beam dithering is required.

The size and width of the fixed annulus may be selected as required. The annulus can be in different size which will result in different SBLs. In particular, using annulus with different sizes and widths, one can craft a light sheet that is optimized for ultralow phototoxicity or high resolution.

FIGS. 11b and 11c illustrate examples of mask patterns for ultralow phototoxicity (LBS1) or high resolution (LBS2) and corresponding results according to this embodiment. From left to right, FIGS. 11b and 11c show the annulus; the diffraction pattern after cropped by the annulus; the cross-section of generated LBS at sample plane; the intensity plot along the dotted yellow line (blue) comparing to the axial point spread function of a NA=1.1 detection objective (red); and the axial plot of overall point spread function, which is compressed by the ultrathin LBS.

According to an embodiment, the annulus size can be designed in a way so that the SBL has axial extent (the profile along z axial) only within the axial PSF of the detection objective, so that minimal amount of background and photobleaching can be achieved. It has been demonstrated that this can be done (but not limited to) by using annulus with size NAmax=0.3 and NAmin=0.115 as shown in FIG. 11b.

According to an embodiment, the annulus size can be designed in a way so that the LBS has ultrathin layers such that the axial extent of detection PSFs can be tightly compressed to achieve better axial resolution. It has been demonstrated that this can be done (but not limited to) by using annulus with size NAmax=0.4 and NAmin=0.225 as shown in FIG. 11c.

It is noted that the tight confinement of PSF can produce multi-peak in the overall point spread function that can affect visualizing, but can be removed completely with any common deconvolution method. Same principle applies to PBS2.

Due to the fact that the diffraction pattern of a single slit would be a simple line for any wavelength, there is no requirement of matching the annulus to the wavelength.

Therefore, a fixed annulus can be applied to any wavelength to generate LBS, as demonstrated in FIGS. 11d, 11e and 11f.

FIGS. 11d and 11e show the experimentally generated LBSs at different wavelengths (488 nm for GFP and 560 nm for mCherry). The point spread functions for each LBS at both wavelengths are measured with 20 nm fluorescent beads (left two columns in FIGS. 11d and 11e), which are in good agreement with the theoretical plot in FIGS. 11b and 11c. FIG. 11f illustrates the measured axial profile of Gaussian beam, LBS1 and LBS2. The Gaussian beam is generated by taking away the annulus. The maximum NA is confined to 0.5 so that the beam waist has a thickness of 600 nm, which is comparable to the thickness of LBS1. Scale bar in FIGS. 11d and 11e is 5 μm.

Figure 12:
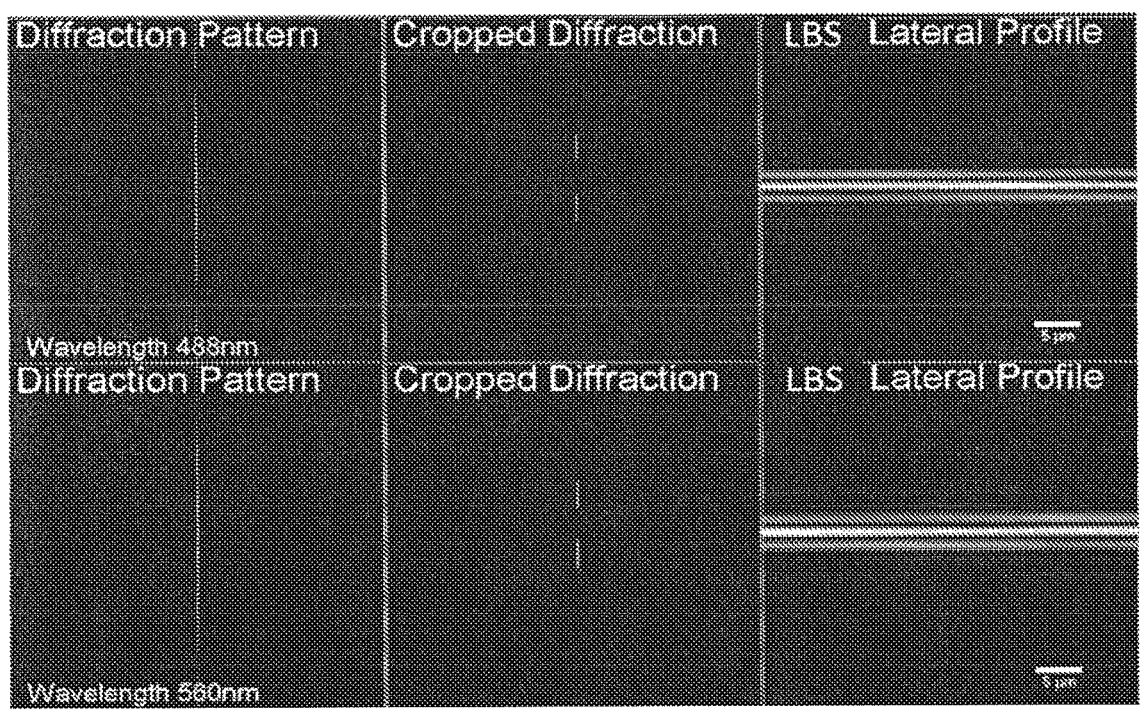
FIG. 12 illustrates a demonstration of generating LBS in different wavelengths with a fixed annulus according to an embodiment of the present application.

FIG. 12 illustrates a demonstration of generating LBS in different wavelengths with a fixed annulus. As shown, the system 1100 with the single slit mask 1105 and the fixed annulus mask 1107 is applicable to different wavelengths.

Hereinafter, examples of a LBS microscope, as well as its control sequences, according to embodiments of the present application will be described with reference to FIGS. 13a, 13b.

Figure 13A:
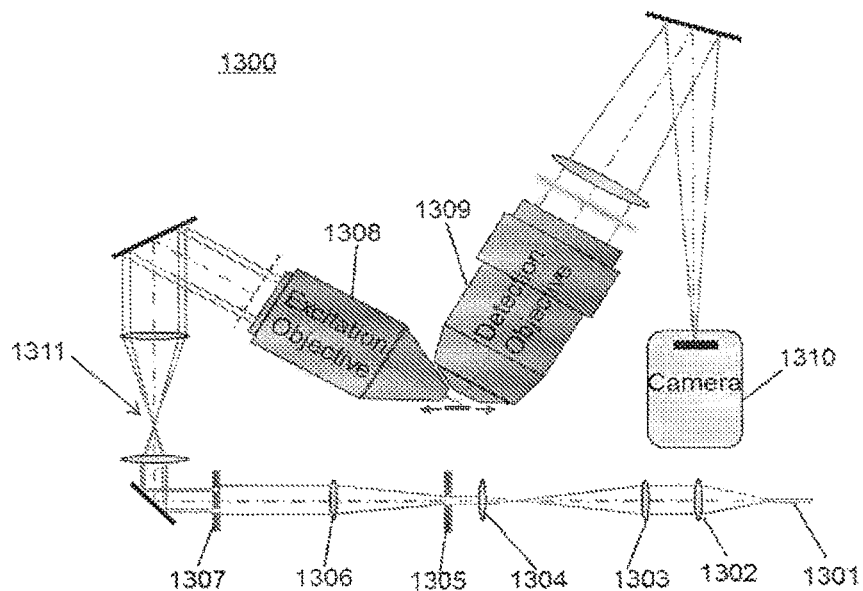
FIG. 13a illustrates the exemplary system schematics of an LBS microscope according to an embodiment of the present application.
Figure 13B:
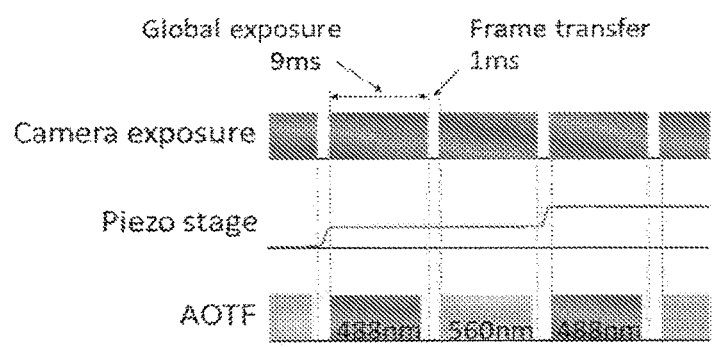

FIGS. 13a and 13b illustrates an exemplary system schematics of a LBS microscope and control sequence. FIG. 13a illustrates the exemplary system schematics of a LBS microscope. The fiber output 1301 was collimated by a collimation lens 1302 and shaped to a stripe by a pair of cylindrical lenses 1303 and 1304 before reaching the single slit mask 1305. A lens 1306 is used to perform Fourier transform after the pattern mask 1305, and project the diffraction pattern onto a fixed annulus 1307. The image of the annulus 1307 is zoomed by 3× via a telescope system 1311 before projected onto the back focal plane of excitation objective 1308

(Special optics, NA 0.7 WD 3.5 mm). The LBS is produced at sample plane 30° to the plane of coverslip. With the relative position between the emission and detection objectives fixed, the sample driven by a piezo stage is scanned horizontally. The fluorescent emission is collected by the detection objective 1309 (Nikon, NA 1.1 WD 3 mm) and captured by a camera 1310. FIG. 13*b* illustrates the triggering sequence used in SBL imaging of FIG. 13*a*. Camera running in synchronized readout mode generates high output during the global exposure and low during data transfer. Laser controlled by an AOTF is turned on only during global exposure. For multicolor imaging, the wavelength is switched for every frame. The piezo stage triggered by the falling of global exposure moves a step forward after both colors are imaged.

In the system as shown in FIGS. 2*a* and 13*a*, the pattern mask or annulus can be inexpensively made of Chrome photomask, or film photomasks. It can also be patterns laser-cut or etched on a thin sheet metal.

Figure 14:
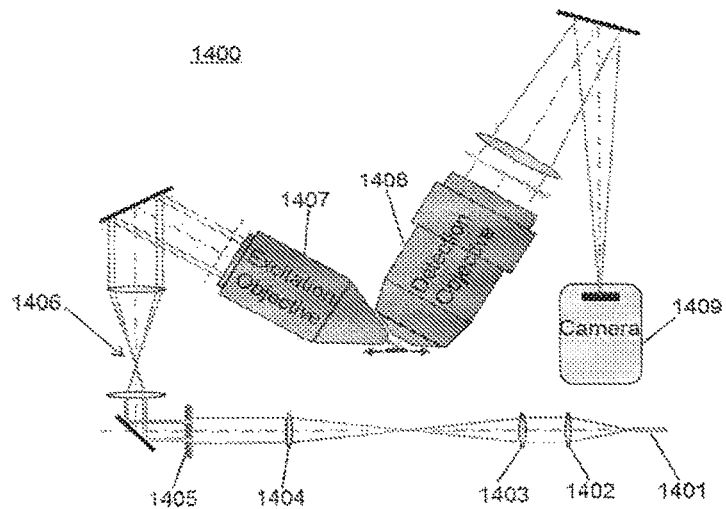
FIG. 14 illustrates the exemplary system schematics of a LBS microscope using a single cylindrical lens and without single slit according to an embodiment of the present application.

According to an embodiment, the single slit can be removed if a line beam is directly created by a single cylindrical lens. In system 1400 as shown in FIG. 14, a single cylindrical lens 1403 focus the beam into a thin line and produces LBS without using the single slit. Components 1404-1409 are corresponding to the components 1306-1311 in FIG. 13.

Figure 15:
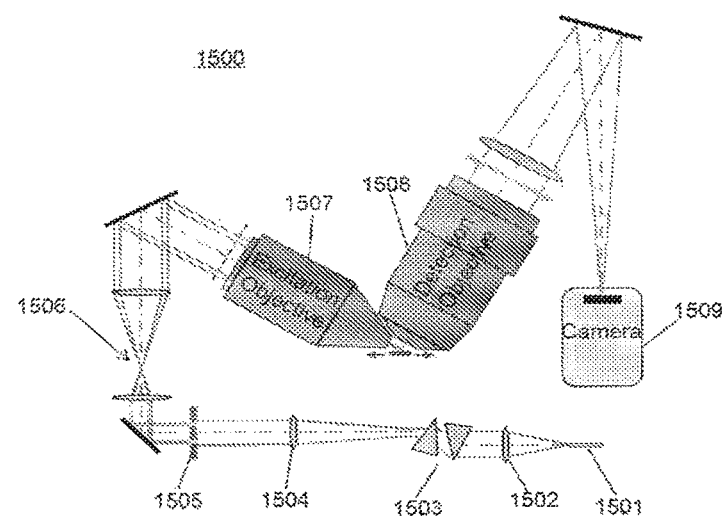
FIG. 15 illustrates the exemplary system schematics of a LBS microscope using prism pairs according to an embodiment of the present application.

Alternatively, a pair of prism pairs can be used to compress the beam into a thin line to produce LBS as shown in FIG. 15. In system 1500, a prism pair 1503 is used to produce a narrow line beam for LBS generation. Components 1504-1509 are corresponding to the components 1306-1311 in FIG. 13.

The above descriptions only refer to some embodiments of the present application and explain the applicable technical principles. It will be appreciated by those skilled in the art that the invention is not limited to the particular embodiments described above, but shall also include embodiments that are implemented by other combinations of features contained in the above embodiments or their equivalents, without departing from the essence and spirit of the invention.

The invention claimed is:

1. A method for generating a non-diffracting light line Bessel sheet (LBS), comprising:
   transmitting an input light beam that has a narrower intensity distribution along a first direction than that along a second direction vertical to the first direction at a first plane through an annulus mask arranged at the first plane to obtain a first light beam; and
   transmitting the first light beam through an excitation objective lens to form a non-diffracting Bessel light sheet.

2. A system for generating a non-diffracting light patterned Bessel sheets (PBS) for multicolor fluorescence microscopy, comprising:
   a first optical arrangement, configured to shape a light beam with more than one wavelength by transmitting the light beam through a pattern mask at a first plane to obtain a patterned light beam;
   a Fourier transform lens arranged after the pattern mask though which the patterned light beam is transmitted, wherein the Fourier transform lens has a Fourier plane after the Fourier transform lens;
   an annulus mask arranged at the Fourier plane after the Fourier transform lens;
   an excitation objective lens arranged after the annulus mask and configured to form non-diffracting patterned light sheets for different wavelengths; and
   a detection objective lens arranged vertically to the non-diffracting light sheets configured to form the fluorescence images at an imaging device,
   wherein the annulus mask is implemented by a 3LCD projector module so that each wavelength simultaneously passes through a corresponding LCD panel in the 3LCD projector module.

3. The system according to claim 2, wherein the pattern mask is a mask with a fixed pattern of shapes for different wavelengths.

4. A system for generating non-diffracting light line Bessel sheets (LBS) for multicolor fluorescence microscopy, comprising:
   a first optical arrangement, configured to shape a light beam with more than one wavelength by transmitting the light beam through a single slit mask at a first plane to obtain a first light beam;
   a Fourier transform lens arranged after the single slit mask and configured to transmit the first light beam to obtain a second light beam, wherein the Fourier transform lens has a Fourier plane after the Fourier transform lens;
   an annulus mask arranged at the Fourier plane after the Fourier transform lens;
   an excitation objective lens arranged after the annulus mask and configured to form non-diffracting light sheets for different wavelengths; and
   a detection objective lens arranged vertically to the non-diffracting light sheets and configured to form the fluorescence images at an imaging device.

5. The system according to claim 4, wherein the single slit mask is fixed for different wavelengths.

6. The system according to claim 4, wherein the annulus mask is fixed for different wavelengths.

7. A system for generating non-diffracting light line Bessel sheets (LBS) for multicolor fluorescence microscopy, comprising:
   a first optical arrangement, configured to shape a light beam with more than one wavelength by transmitting the light beam through a narrow line generated by a single cylindrical lens at a first plane to obtain a first light beam;
   a Fourier transform lens arranged after the narrow line and configured to transmit the first light beam to obtain a second light beam, wherein the Fourier transform lens has a Fourier plane after the Fourier transform lens;
   an annulus mask arranged at the Fourier plane after the Fourier transform lens;
   an excitation objective lens arranged after the annulus mask and configured to form non-diffracting light sheets for different wavelengths; and
   a detection objective lens arranged vertically to the non-diffracting light sheets and configured to form the fluorescence images at an imaging device.

8. A system for generating non-diffracting light line Bessel sheets (LBS) for multicolor fluorescence microscopy, comprising:
   a first optical arrangement, configured to shape a light beam with more than one wavelength by transmitting the light beam through a narrow line generated by a prism pair at a first plane to obtain a first light beam;
   a Fourier transform lens arranged after the narrow line and configured to transmit the first light beam to obtain a second light beam, wherein the Fourier transform lens has a Fourier plane after the Fourier transform lens;

an annulus mask arranged at the Fourier plane after the Fourier transform lens;
an excitation objective lens arranged after the annulus mask and configured to form non-diffracting light sheets for different wavelengths; and
a detection objective lens arranged vertically to the non-diffracting light sheets and configured to form the fluorescence images at an imaging device.

* * * * *